United States Patent [19]

Schmidt

[11] 4,025,049

[45] May 24, 1977

[54] HOSE COUPLING

[75] Inventor: Hans Joachim Schmidt, Wipperfurth, Germany

[73] Assignee: Armaturenfabrik Hermann Voss, Wipperfurth, Germany

[22] Filed: Sept. 16, 1975

[21] Appl. No.: 614,057

[30] Foreign Application Priority Data

Sept. 16, 1974 Germany ............................ 2444245

[52] U.S. Cl. .............................. 251/149.6; 285/317
[51] Int. Cl.² .................... F16L 29/00; F16L 37/28
[58] Field of Search ................. 251/149.6; 285/317

[56] References Cited

UNITED STATES PATENTS

| | | | |
|---|---|---|---|
| 1,578,504 | 3/1926 | Bronson et al. | 285/317 |
| 2,023,428 | 12/1935 | Liebhardt | 285/317 X |
| 2,102,774 | 12/1937 | Williams | 285/317 X |
| 2,431,268 | 11/1947 | McIntyre | 285/317 |
| 2,700,559 | 1/1955 | Jensen | 285/317 X |
| 2,805,089 | 9/1957 | Hansen | 285/317 |
| 2,962,307 | 11/1960 | Nebinger | 285/317 |
| 3,144,237 | 8/1964 | Zurit et al. | 251/149.6 |
| 3,873,062 | 3/1975 | Johnson | 251/149.6 |
| 3,918,679 | 11/1975 | Silvana | 251/149.6 X |

*Primary Examiner*—William R. Cline
*Attorney, Agent, or Firm*—Allison C. Collard

[57] ABSTRACT

Hose coupling of the kind having at least two axially interconnectable members, with retaining means for releasably interconnecting at least one pair of the members, comprising a plug portion and a connector portion, and a manually operable pressure member slightly protruding from the connector portion for releasing the interconnection between the plug and the connector portions; wherein the plug portion has a shank region with a circumferential groove therein; while the connector portion has at least one recess therein, with a corresponding number of claws in the latter, that are part of the retaining means, adapted to engage the groove in the shank region of the plug portion. The invention also relates to a handle-shaped embodiment of the plug portion, and to a distribution box that can have several outlet branches. Any of the inventive members of the hose coupling may have a hose clamp attached thereto, leading to an external consumer point.

13 Claims, 7 Drawing Figures

HOSE COUPLING

BACKGROUND OF THE INVENTION

The invention relates to a hose coupling that essentially consists of two axially interconnectable elements or portions of which one is a plug and the other a connector, immobilized in their mated condition by the aid of retaining means, and which portions can be separated from each other only after the retaining means have been disengaged.

Hose couplings are known in various structural embodiments. It has however been observed that the known couplings do not always and completely satisfy the technical requirements, and particularly not because they are relatively cumbersome and complicated to operate, not to mention their generally unsatisfactory sealing performance.

The uncoupling of such known hose clamps or couplings usually requires the use of both hands, it being known manually to release the retaining means that immobilize the plug portion by a rotational or a pushing movement of a sleeve-nut like element so that the plug portion can then be removed with the other hand while the released condition of the coupling member is maintained.

The coupling and uncoupling mechanisms of the prior-art hose couplings are in addition relatively complicated in their structures, consisting as they do of an intolerably great number of parts, so that they are consequently susceptible to troubles and breakdowns.

SUMMARY OF THE INVENTION

It is therefore one of the major objects of the present invention to provide a hose coupling which is simple to manipulate and has an economically advantageous construction with only a few parts or elements.

According to major features of the invention, a hose coupling is provided in which at least one claw is used as the retaining means, lodged in a recess of the connector portion, preferably radially protruding into the plug portion where it engages a circumferential groove. For withdrawing the at least one claw, a manually operable pressure member is disposed in the connector portion, which acts by moving the claw out of engagement with the groove. Such a coupling has only a few operative parts and is very easy to manipulate: actually a simple pressure with the thumb is sufficient to release the interconnection.

The invention provides a pair of the claws, symmetrically disposed in the connector portion, and radially inwardly acting against the biasing force of individual springs. The rear ends of the claws are rounded off and pivotable. The springs keep the claws in their engaging position, while the rounded ends make for an easy withdrawal of the claws when the biasing force is momentarily relieved.

The preferred radial movement of the claws can be limited by appropriate stops in the form of noses. The orientation of the claws is suggested to be transversal to a common longitudinal axis of the plug and connector portions.

At the end of the connector portion opposite to the plug portion, a hose clamp can also be attached. In a preferred, exemplary structural embodiment, the clamp may have a main body portion, a clamping ring, a sleeve nut for radially contracting the ring, and an appropriate outer thread therefor on an area of larger diameter of the body portion. In another area, having a smaller diameter, a hose connection may be formed with a profile toothing, adapted to have an external hose removably attached to the clamp.

The inventive hose coupling may also incorporate a distribution box for connecting several hose clamps thereto, preferably in the horizontal plane, with the plug portion being upwardly directed. The latter may have a water- or spring-operated valve therein.

The just described valve can also be provided in the connector portion, to prevent backflow. In either embodiment, a tappet may be incorporated in the valve, acted upon when the associated portion (the connector or the plug portion, as the case may be) is attached, thereby to free the liquid flow.

According to further, optional features of the invention, the plug portion may have a coupling shaft at one end, with an annular groove and a packing ring about it; the other end may have a union or connection, preferably with an inner thread, adapted for the connection of any external conduit.

As an alternative of the just explained features, the plug portion may have the shape of a handle, similarly with a coupling shaft at one end, while the other end has the union or connection thereat, again adapted for the connection of an external conduit, which may lead to a consumer point.

It has been found particularly advantageous to make at least some of the parts of the inventive hose coupling from a resilient, light-weight, water-tight and impact-resistant plastic material. Such materials are weather-proof and thus particularly suitable for outdoor use, e.g. in gardens, where the invention can be used more advantageously.

The inventive hose coupling is lightweight, has few moving parts, is easy to produce, assemble and manipulate, so that it is considered to constitute a major improvement over hitherto known devices of this kind.

Other objects and many of the attendant advantages of the invention will be readily appreciated as the same becomes better understood by reference to the following detailed description, when considered with the accompanying drawings, wherein

DESCRIPTION OF THE PREFERRED EMBODIMENTS

Figure 2:
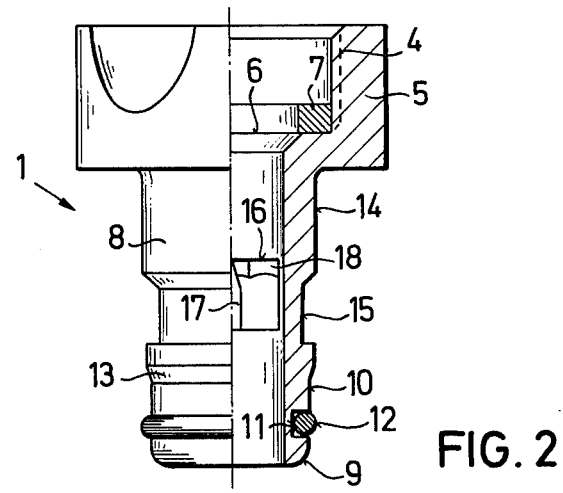
FIG. 2 is a similar view of a plug portion of the device, connectable for example to a water faucet.
Figure 1:
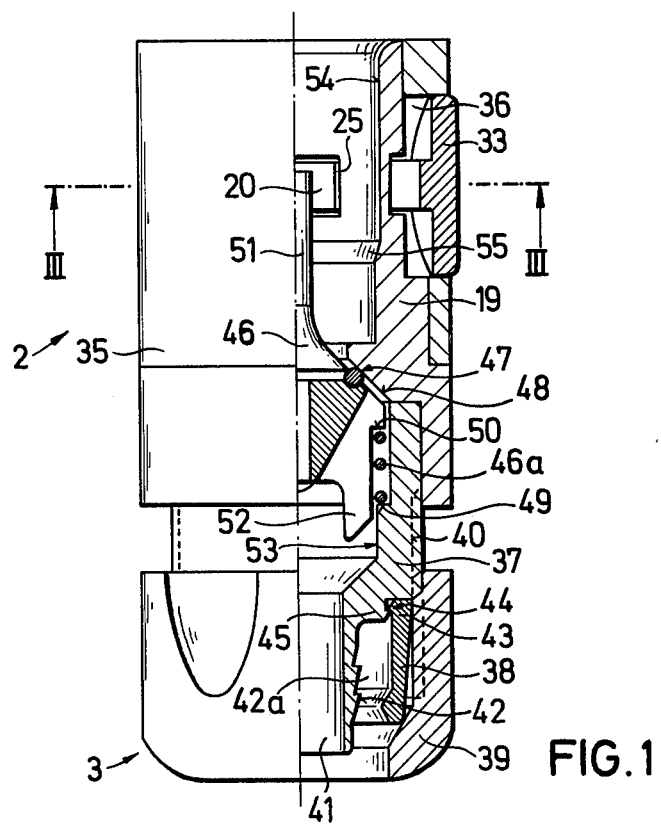
FIG. 1 is a partly longitudinally sectioned view of a connector portion of an exemplary hose coupling according to the present invention.
Figure 3:
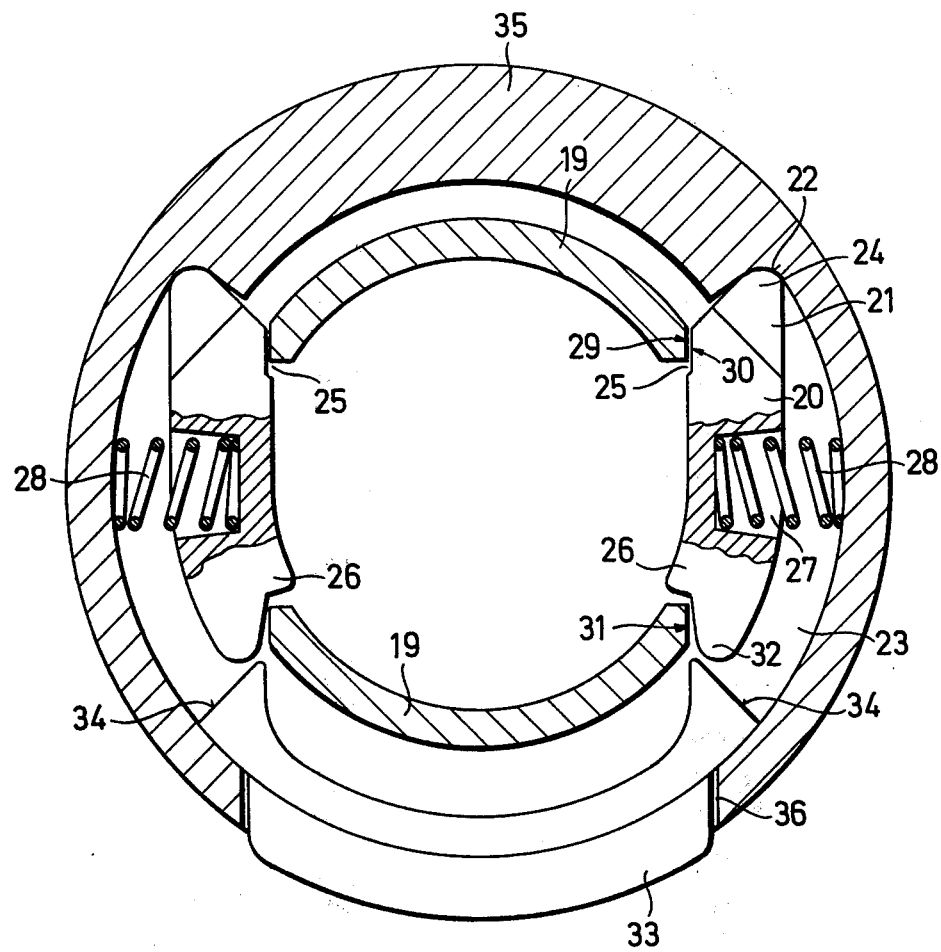
FIG. 3 is a transversal sectional view on a somewhat enlarged scale, taken in FIG. 1 along the line III—III.

The hose coupling as shown in FIGS. 1 through 3 is constituted by a plug portion 1 and a connector portion 2, the latter carrying an optional hose clamp 3 at its end (see the lower end of FIG. 1).

Referring more particularly to FIG. 2, the plug portion 1 consists of an inlet or discharge union 5 having an inner thread 4, with a sealing ring 7 applied to a receding bottom circular ring surface 6, preferably made from an elastic material such as rubber or plastic, and finally having a coupling shaft 8. The latter is rounded at 9 at its free front end. The rounding is followed in rearward direction by a cylindrical region or portion 10 having therein an annular groove 11 in which a packing ring 12 rests. The region 10 continues in a conical portion 13, then in another cylindrical shank region 14 of a greater diameter, having therein a circumferential groove 15 which is engaged by appropriate retaining means of the connector portion 2, as will be described later.

The hollow inside of the plug portion 1 has therein a guide bushing 16 which has a tappet 17 and water passage openings 18, all as shown. The bushing 16 can be made in one piece with the plug portion 1 or made separate and assembled with the same by way of glueing, welding and the like.

It may be summarized at this point that the described plug portion 1 includes the structural elements identified by numerals 4 through 18. The connector portion 2 to be described hereinafter in turn includes the elements 19 through 36, 45 through 52, 46a, 54 and 55. Finally, the earlier-mentioned hose clamp 3, to be described later, has the elements 37 through 44, 42a and 53 therein. Other structural elements of further features of the invention will be summarized later.

It will now be described with reference to FIGS. 1 and 3 that the connector portion 2 has a substantially tubular main body portion 19 which has inserted therein the retaining means that can be seen in FIG. 3. These are essentially claws 20 with a substantially T shape, having horizontal beam or foot portions 21 which latter rest in cavities 22 of recesses 23 and which have rounded-off end parts 24. The retaining means are positioned in the illustrated condition by means of the feet 21 which are widened with respect to the claws 20.

With part of their widths, the claws 20 pass or protrude through slots 25 that are provided in the connector body 19. These regions 26 of the claws 20, protruding into the inside of the body 19, engage the groove 15 of the plug portion 1 and consequently immobilize the same in axial direction with respect to the connector portion 2. The depth of the claws 20 corresponds at most to the width of the groove 15 in the plug portion.

Each claw 20 has in its rear a blind hole 27 in which a compression spring 28 is inserted to keep the respective claws in the arresting position. Near the feet 21 the claws 20 have planar surfaces 30 resting against plane-worked edges 29 of the slots 25, and curved stop noses 32 on the opposite narrows sides, the noses resting thereagainst and also against edges 31 of the connector body 19. The penetration depth of the claws 20 into the inside of the coupling is precisely limited by these arrangements.

The claws 20 are preferably oriented transversally to a common longitudinal axis of the plug and the connector portions.

A pressure member 33 that can be actuated by the movement of the thumb has slide borders 34 that act on the noses 32 of the claws 20 when the member 33 is radially pushed inward, eventually to spread apart the claws 20, the latter rolling off at their feet 21 and releasing the groove 15 of the plug portion 1 so that the latter can be removed from the connector portion 2.

The claws 20 with their springs 28 as well as the member 33 are seated within a ring 35 that slightly protrudes beyond part of the length of the connector body 19. The ring 35 has on its inside the recesses 23 for the claws 20 and transversal slots 36. The latter are filled up by the outer part of the member 33 (which is being inserted into the connector portion 2 from inside during assembly. The connector body 19 and the ring 35 are rigidly interconnected by glueing or welding.

The hose clamp 3 (see again FIG. 1) is attached with the rear end of the connector portion 2 (that is at the end opposite where the plug portion 1 can be inserted). The clamp consists of a stepped, tubular main body portion 37, a clamping ring 38 and a sleeve nut 39 that exerts radial contraction onto the ring 38. It might be added at this point that the elements 19, 20, 33 as well as 35 to 39 are shown in both FIGS. 1 and 3.

With its area of larger diameter the clamp body 37 is inserted about halfway into the connector body 19 where it is glued, welded or otherwise rigidly attached in a fluid-tight manner. Another portion of larger diameter of the clamp body 37 has an outer thread 40 for the sleeve nut 39. The smallest-diameter portion of the body 37 is in turn built in the form of a hose connection 41 which has an outer profiled toothing 42 thereon for purposes to be explained hereunder.

The ring 38 has longitudinal slots therein up to an annular flange 43, as shown, and has a nose 44 at its end where the flange 43 is provided, the nose catching on a similar nose (not numbered) on a stepped portion 45 of the connector body 19, and is thus unremovably secured. A gap 42a results between the connection 41 and the clamping ring 38, into which gap the end of a hose can be introduced (omitted from the drawings) and tightened therein by rotating the sleeve nut 39.

Coming now back to details of the connector portion 2, it has therein a valve 46 (see FIG. 1) that prevents back-flow from the hose clamp 3 (when connected) toward the front end of the connector portion 2 unless the valve is opened by interconnection with the plug portion 1, as will be explained. The valve is biased to the closing position by a compression spring 46a, a packing ring 47 being inserted that provides a seal against a cone 48 of the connector body 19. The spring 46a rests on the one hand on a circular ring surface 49 of the clamp body 37 and on the other hand on another circular ring surface, 50 of the valve 46.

On the front or plug-inserting end the valve has a tappet 51 which hits the tappet 17 of the plug portion 1 when the same is inserted into the connector portion 2 so that the valve 46 opens while guide laminae 52 slide along the inner wall of a bore 53 in the clamp body 37. A bore 54 in the connector body 19 continues in a cone 55 on which rests the packing ring 12 of the plug portion 1.

Usually the connector portion 2 with its hose clamp 3 is provided at both ends of a hose. In terms of connecting elements, a plug portion 1 is provided as described with reference to FIG. 2, a somewhat modified, handle-shaped plug portion 56 in accordance with FIGS. 4 and 5 to be described hereinafter, and/or a distribution box 57 according to FIGS. 6 and 7.

Figure 4:
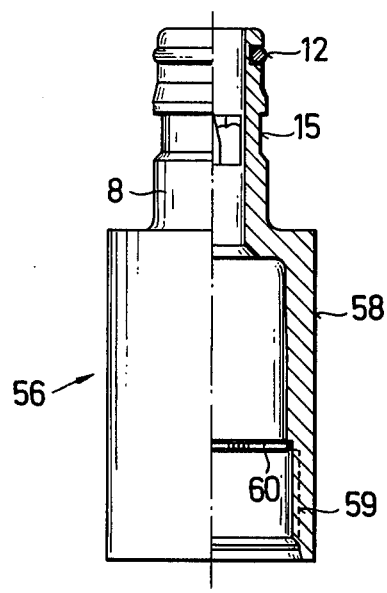
FIG. 4 is a view similar to those of FIGS. 1 and 2 of a modified plug portion that can be used at the consumer end, axially reversed with respect to FIG. 2 (between front and rear, or bottom and top ends of FIG. 2)
Figure 5:
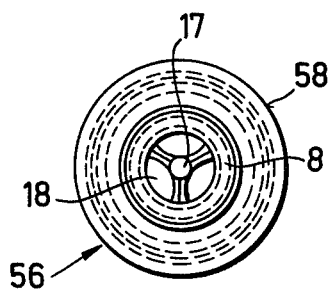
FIG. 5 is a frontal end elevation of the plug portion of FIG. 4.

Describing now FIGS. 4, 5, the modified plug portion 56, constituting a handle, includes the earlier-described coupling shaft 8 (see FIG. 2), which continues as a shank portion 58 which has preferably serrations or knurled portions thereon, with an inner thread 59 (schematically shown) at the free rear end to which a consuming point such a shower, rinsing brush, sprayer and the like can be attached, which attachments of course have appropriate outer threads for engagement with the inner thread 59. The shank portion 58 may be fitted with a sieve 60 to catch possible accumulating dirt, and which sieve should be cleaned or rinsed from time to time. The elements used in FIGS. 4, 5 are 58 through 60 (in addition to some elements that were described earlier).

Figure 6:
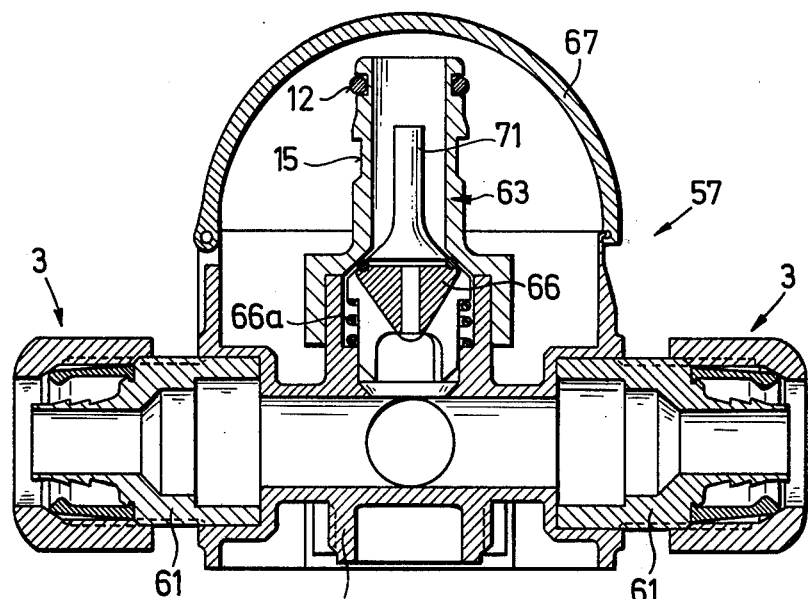
FIG. 6 is a horizontal sectional view through a distribution box fitted with a slightly modified plug portion.
Figure 7:
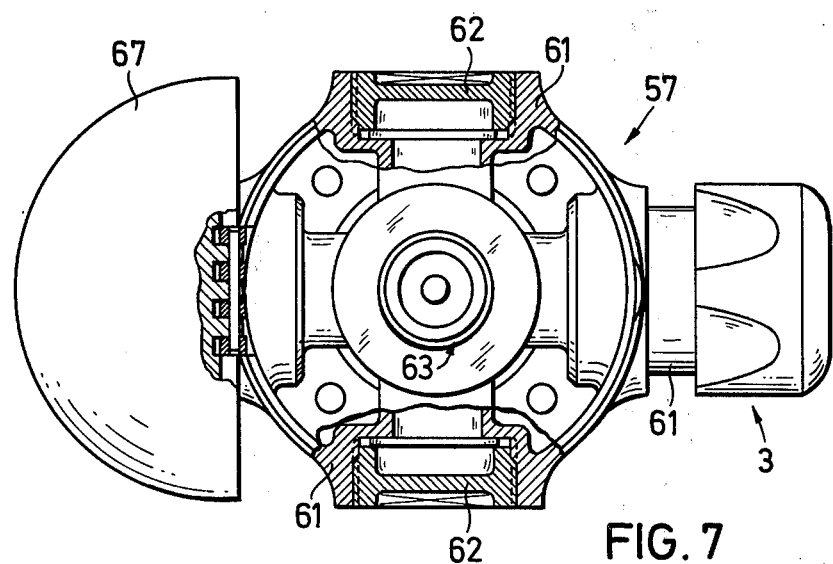
FIG. 7 is a sectioned elevation of FIG. 6 (rotated for space consideration by 90° in a counter-clockwise sense).

Dealing now with FIGS. 6, 7 (that can be summarized right now as covering the structural elements 61 to 63, 65 to 67 and 71, in addition to earlier-described parts), the already mentioned distribution box 57 may have several horizontally spaced apart hose clamps 3 of the described kind at respective outlet branches 61 (see FIG. 1 and its description). From among the several branches 61 those that are not in use can be closed off with blind plugs 62 (see FIG. 7).

The box lodges a plug portion 63 substantially corresponding in its outer shape and in its basic construction to the plug portion 1 in accordance with FIG. 1, but reversed with respect to top and bottom, and thus similar in its position to the modified plug portion 56, which portion 63 however has a valve 66 therein. In a known manner, the valve is closed by either the water pressure itself or by a restoring spring 66a, depending on the direction of flow. The valve 66 is opened when a connector portion 2 is engaged therewith, as described before for the portions 1 and 2 of FIGS. 2 and 1, respectively. A tappet 71 of the valve 66 would then be acted upon by the tappet 51, as has been described earlier in connection with the cooperating tappets 17 and 51 (the elements 66, 66a and 71 are similar to the parts 46, 46a and 51, as described earlier).

The distribution box 57 may also be provided with a downwardly directed socket 65 having an outer thread by which the box can be attached to and supported by a device, the floor or some other place where it is to be used (including, for example, manholes and other places of permanent installation). A cover 67 may close the box 57 when not in use at the valve 66, to prevent the entrance of dust. The cover may be hinged as shown on the left-hand side of the drawing and/or may have snap-action closing means (right-hand illustration parts in FIG. 6).

The distribution box 57 may have a centrally located inlet unnumbered circle in the middle), or could also be operated through the valve 63 if a connector portion 2 is attached thereto, as mentioned earlier. All branches 61 preferably constitute outlets.

It will be understood by those skilled in the art that certain details of the exemplary embodiments (e.g. the plug portions 1, 56 and 63) can be combined with details of the others, although not specifically illustrated or described. Thus, for example, any portion or feature shown for the plug portion 1 of FIG. 2 can understandably be combined with features shown in FIGS. 4, 5 and/or 6, 7. Conversely, the inner valve 66 of the plug portion 63 of FIG. 6 could also be incorporated, if necessary, into the portion 1.

All described parts of the inventive hose coupling are preferably made of a tough, impact-resistant and weatherproof plastic or some light metal. The hose coupling is particularly suitable for underground applications, and can form a functionally integral and important component of a stationary water-supply system, for example for watering gardens and the like.

It should be understood, of course, that the foregoing disclosure relates only to preferred embodiments of the invention and that it is intended to cover all changes and modifications of the examples described which do not constitute departures from the spirit and scope of the invention.

What I claim is:

1. A hose coupling comprising at least two axially interconnectable members, including at least one male and at least one female portion, and having therein retaining means for releasably interconnecting at least one pair of said members, comprising in combination: a plug portion (1, 56, 63) having a shank region (14) therealong and a circumferential groove (15) in the latter; and a connector portion (2) axially interconnectable with said plug portion, and having at least one recess (23) therein, said plug and said connector portions having a substantially common longitudinal axis when interconnected, each said at least one recess including a cavity; a corresponding number of pivotally supported claws (20) in the latter, that constitute part of said retaining means, said claws each having a generally lengthwise axis oriented substantially transversally to said substantially common longitudinal axis, and being adapted to engage said groove when said plug and said connector portions are interconnected, each said claws including at one end a foot (21) mounted in said cavity and at the other end shoulder regions (26) and curved stop noses (32); said connector portion including a tubular main body portion (19) having through slots (25) at one end and edges (31) at another end, said shoulder regions (26) protruding through said slots for engagement with said circumferential groove, said noses (32) resting against said edges; and a single manually operable pressure member (33) slightly protruding from said connector portion and having a generally lengthwise axis oriented substantially transversally to said substantially common longitudinal axis and to the axis of said claws, the axis of said claws and said single manually operable member being normal to each other, said pressure member including means acting on said noses for releasing upon operation the interconnection between said plug and said connector portions, by moving said claws out of the engagement with said groove.

2. The hose coupling as defined in claim 1, wherein said plug portion (1, 56, 63) has a part (14) straddled by said claws (20), of which there are two, substantially symmetrically disposed with respect to said straddled part; and further comprising means (28) for substantially inwardly biasing said claws into engagement with said circumferential groove (15) in the plug portion (1, 56, 63), said claws being pivotable about one (24) of their ends, said means including a pressure spring (28), each said claw having a blind end bore (27) at a side opposite to said shoulder, said bore having a base and one end of said spring being in engagement with said base, said connector having inner side facing said recess, and the other end of said spring being supported in said recess in engagement with said inner side.

3. The hose coupling as defined in claim 1, including an interconnectable hose clamp (3), and wherein said connector portion (2) has therein a springbiased valve (46) including a compression spring (46a) for preventing backflow when said plug portion (1, 56, 63) is disconnected from said connection portion (2), said valve having a ring surface (50) for holding one end of said spring, said hose clamp including a clamp body (37) having a circular ring surface (49), said spring (46a) being held between said ring surfaces, said valve (46) being biased to a closing position by said compression spring, and said plug portion (1, 56, 63) has therein a substantially axially disposed first tappet (17); and said connector portion (2) has therein a similarly disposed second tappet (51), operatively associated with said valve (46) therein, said second tappet being engageable by said first tappet when said plug and said connector portions are interconnected, thereby to open said valve.

4. The hose coupling as defined in claim 1, wherein one of said plug (1, 56, 63) and said connector (2) portions has therein at least one outlet branch for removably attaching thereto a corresponding number of hose clamps (3) leading to respective external consumer points.

5. The hose coupling as defined in claim 4, wherein at least one of said hose clamps (3) includes a main body portion (37), a clamping ring (38) associated with the latter, a sleeve nut (39) for exerting radial contraction to said ring, said nut being engageable with said main body portion by the intermedairy of an outer thread (40) applied to about half the length of an area of larger diameter thereof; and wherein a hose connection (41) is formed in an area of smaller diameter of said main body portion, said hose connection having an outer profile toothing (42) adapted to have an external hose and the like removably attached thereabout.

6. The hose coupling as defined in claim 4, further comprising a distribution box (57) in which said plug portion (63) is incorporated; said box including at least two of said outlet branches (61) for connectng a corresponding number of said hose clamps (3); said plug portion having therein a spring-biased (66a) valve (66) for preventing backflow when said plug portion is disconnected from said connector portion (2).

7. The hose coupling as defined in claim 1, wherein said plug portion (1, 56, 63) includes a coupling shaft (8, 10) at one end, insertable in a corresponding recess (54) of said connector portion (2), with an annular groove (11) about said shaft, and a packing ring (12) inserted in the latter, for sealing engagement with portions of said recess of the connector portion; while the other end of said plug portion has thereat a union (5) with an inner thread (4) applied thereto, adapted for connection to an external conduit that has an appropriate outer thread thereon.

8. The hose coupling as defined in claim 1, wherein said plug portion (56) is handle-shaped and includes a coupling shaft (8) at one end, insertable in a corresponding recess (54) of said connector portion (2); while the other end of said plug portion has thereat a union with an inner thread (59) applied thereto, adapted for connection to an external consumer conduit that has an appropriate outer thread thereon.

9. The hose coupling as defined in claim 1, said plug portion includes a coupling shaft (8) having a rounded portion (9) at its front face, a conical tapered portion (13) connected with said coupling shaft, a cylindrical region (10) joining said rounded portion with said conical portion (9), said cylindrical region having an annular circumferential groove (11), and an annular packing ring seal (12) in said groove.

10. The hose coupling as defined in claim 9, said connector having a bore (54), a core (55), which in the interconnected condition of said plug portion and said connector portion, engages said seal.

11. The hose coupling as defined in claim 10, wherein said claws have a T-shape, said foot having rounded-off end parts (24) mounted in said cavity.

12. The hose coupling as defined in claim 1, including means for substantially inwardly biasing said claws into engagement with said circumferential groove comprising a blind end core (28) at a side opposite to said retaining shoulder, said bore having a base, and a pressure spring (27) in said bore, one end of said pressure spring being in engagement with one side of said recess and the other end of said pressure spring being in engagement with the base of said bore to urge said claws into engagement with said edges (31).

13. The hose coupling as defined in claim 12, wherein said pressure member includes slide borders (34) acting on said noses to overcome the pressure of said springs to spread said claws apart.

* * * * *